(12) United States Patent
Molin (10) Patent No.: US 7,909,609 B2
(45) Date of Patent: Mar. 22, 2011

(54) EDUCATIONAL DEVICE AND METHOD OF USE

(76) Inventor: Nicole Janique Molin, Winnipeg (CA)

( * ) Notice: Subject to any disclaimer, the term of this patent is extended or adjusted under 35 U.S.C. 154(b) by 338 days.

(21) Appl. No.: 12/237,906

(22) Filed: Sep. 25, 2008

(65) Prior Publication Data

US 2009/0215013 A1    Aug. 27, 2009

(30) Foreign Application Priority Data

Oct. 10, 2007   (CA) ...................................... 2606743

(51) Int. Cl.
*G09B 19/02* (2006.01)
(52) U.S. Cl. ........................................................ 434/188
(58) Field of Classification Search .................. 434/188, 434/189, 190, 191, 193, 200, 201, 205, 208, 434/210, 211, 216
See application file for complete search history.

(56) References Cited

U.S. PATENT DOCUMENTS

| 923,863 | A | * | 6/1909 | Lehr | 273/159 |
|---|---|---|---|---|---|
| 1,588,766 | A | * | 6/1926 | Massey | 273/123 R |
| 2,296,799 | A | * | 9/1942 | Rosin | 235/61 B |
| 2,529,413 | A | * | 11/1950 | Petersen | 434/83 |
| 2,708,862 | A | | 5/1955 | Fanning | |
| 2,728,149 | A | | 12/1955 | Radt | |
| 2,932,908 | A | | 4/1960 | Gough | |
| 2,949,681 | A | * | 8/1960 | Knefell | 434/191 |
| 3,967,388 | A | * | 7/1976 | Verkade et al. | 434/278 |
| 4,493,654 | A | * | 1/1985 | Stuart | 434/347 |
| 4,979,749 | A | * | 12/1990 | Onanian | 273/282.1 |
| 5,215,467 | A | * | 6/1993 | Brischke | 434/214 |
| 5,433,611 | A | * | 7/1995 | Dreyfous | 434/211 |
| 5,639,090 | A | * | 6/1997 | Stevens | 273/287 |
| 6,065,968 | A | * | 5/2000 | Corliss | 434/83 |
| 6,129,551 | A | * | 10/2000 | Martin | 434/200 |
| 6,413,099 | B2 | | 7/2002 | Rainey | |

* cited by examiner

*Primary Examiner* — Kurt Fernstrom
(74) *Attorney, Agent, or Firm* — Ade & Company Inc.; Ryan W. Dupuis; Kyle R. Satterthwaite (57) ABSTRACT

A method of counting in multiples uses an educational device comprising a base and a set of ten markers positioned on the base spaced apart from one another along a generally annular path. Each marker is associated with a respective one of a range of numbers 0 through 9 in a sequence about the annular path of the device. Elastic bands or some other visually indicating links are used to visually associate the marker having the number 0 associated therewith with another one of the markers having the number associated therewith corresponding to the final digit of the next number in the sequence of numbers. Other numbers of the sequence when counting in multiples can similarly be visually indicated with links so that following the links indicates the final digit of each number in the sequence when counting in multiples.

20 Claims, 2 Drawing Sheets

EDUCATIONAL DEVICE AND METHOD OF USE

This application claims foreign priority benefits from Canadian Patent Application 2,606,743, filed Oct. 10, 2007.

FIELD OF THE INVENTION

The present invention relates to an educational device and the method of use of the educational device to assist in teaching mathematical concepts, for example arithmetic and geometry.

BACKGROUND

Teaching aids are known to be desirable for assisting in educating children of various concepts, including mathematics. U.S. Pat. No. 6,413,099 belonging to Rainey discloses one such example of a teaching device, however the device is somewhat abstract in its representation of mathematical concepts so that it is difficult for use by early learners. Furthermore it is not particularly useful in providing assistance in learning sequences of numbers.

U.S. Pat. Nos. 2,728,149 belonging to Radt, 2,932,908 belonging to Gough, 1,588,766 belonging to Massey and 2,708,862 belonging to Fanning disclose various examples of games and the like with various numerical notations thereon however none are suitable for assistance with sequences using base ten numbers in a suitable format for teaching early learners.

Another example of a game is available on a website by NRICH at the University of Cambridge, Centre for Mathematical Sciences, on Wilberforce Road in Cambridge in which various patterns can be illustrated on a circle; however there is no disclosure as to how the game may be used as a mathematical tool.

SUMMARY OF THE INVENTION

According to one aspect of the present invention there is provided a method of indicating a final digit of each number in a sequence of numbers when counting in multiples, the method comprising:

providing an educational device comprising a base and a set of ten markers positioned on the base, the markers being spaced apart from one another along a generally annular path;

associating each marker with a respective one of a range of numbers 0 through 9;

associating the numbers with the markers in a sequence such that the marker having the number 0 associated therewith is positioned between the marker having the number 9 associated therewith and the marker having the number 1 associated therewith and the remaining markers are positioned in increasing numerical order when advancing from one marker to the next in a first direction about the annular path;

visually associating the marker having the number 0 associated therewith another one of the markers having the number associated therewith corresponding to the final digit of the next number in the sequence of numbers; and visually associating each previously associated marker with a subsequent one of the markers having the number associated therewith corresponding to the final digit of the subsequent number in the sequence of numbers until the subsequent one of the markers is visually associated with the marker having the number 0 associated therewith.

By providing a set of ten markers associated with numbers zero through nine respectively along a generally annular path in which links can visually associate markers with one another, a useful teaching device results in which the links can be used to indicate a pattern that a final digit follows in a sequence of numbers when counting in multiples. Many different patterns can be visualized on a device according to the structure of the present invention to assist in counting in multiples of any number, one through ten or more when following the method of the present invention as disclosed herein. Indicating the final digit to an early learner of numbers and sequences provides some guidance until the learner begins to understand the patterns sufficiently that they no longer require the visual assistance of the educational device described herein.

The method may include indicating a final digit of each number in a sequence of numbers when counting in multiples of one by visually associating the markers relative to one another with links forming a decagon and advancing through the markers along the links generally in the first direction.

The method may include indicating a final digit of each number in a sequence of numbers when counting in multiples of nine by visually associating the markers relative to one another with links forming a decagon and advancing through the markers along the links generally opposite to the first direction.

The method may include indicating a final digit of each number in a sequence of numbers when counting in multiples of two by visually associating the markers relative to one another with links forming a pentagon and advancing through the markers along the links generally in the first direction.

The method may include indicating a final digit of each number in a sequence of numbers when counting in multiples of eight by visually associating the markers relative to one another with links forming a pentagon and advancing through the markers along the links generally opposite to the first direction.

The method may include indicating a final digit of each number in a sequence of numbers when counting in multiples of three by visually associating the markers relative to one another with links forming a decagram and advancing through the markers along the links generally in the first direction.

The method may include indicating a final digit of each number in a sequence of numbers when counting in multiples of seven by visually associating the markers relative to one another with links forming a decagram and advancing through the markers along the links generally opposite to the first direction.

The method may include indicating a final digit of each number in a sequence of numbers when counting in multiples of four by visually associating the markers relative to one another with links forming a pentagram and advancing through the markers along the links generally in the first direction.

The method may include indicating a final digit of each number in a sequence of numbers when counting in multiples of six by visually associating the markers relative to one another with links forming a pentagram and advancing through the markers along the links generally opposite to the first direction.

The method may include indicating a final digit of each number in a sequence of numbers when counting in multiples of five by visually associating the marker associated with the number 0 with the marker associated with the number 5.

According to another aspect of the invention there is provided an educational device comprising:

a base;

a set of ten markers positioned on the base, spaced apart from one another along a generally annular path;

each marker being associated with a respective one of a range of numbers 0 through 9;

the numbers being associated with the markers in a sequence such that the marker having the number 0 associated therewith is positioned between the marker having the number 9 associated therewith and the marker having the number 1 associated therewith and the remaining markers are positioned in increasing numerical order when advancing from one marker to the next in a first direction about the annular path;

a plurality of links, each being arranged to visually associate one of the markers with another one of the markers.

Each link is preferably arranged to indicate a straight path between the markers being visually associated with one another by the link.

The ten markers are preferably evenly spaced apart along the generally annular path.

The generally annular path is preferably circular.

Each marker may comprise a post extending upwardly from the base.

The base may be substantially flat in which each marker comprises a post extending upwardly from the base, substantially perpendicularly to the base.

When each marker comprises a post, each link preferably comprises an elastic loop arranged to be extended about an associated pair of the markers.

There may be provided indicia adjacent each marker which indicates the number associated with the marker.

The links may be joined between the markers to form a decagon in which the ten markers form the apexes of the decagon.

The links may also be joined between the markers to form a decagram in which the ten markers form the apexes of the decagram.

The links may further be joined between five of the markers comprising each second one of the markers along the generally annular path starting with the marker associated with the number 0 such that the links form a pentagon in which the five markers form the apexes of the pentagon.

The links may yet further be joined between five of the markers comprising each second one of the markers along the generally annular path starting with the marker associated with the number 0 such that the links form a pentagram in which the five markers form the apexes of the pentagram.

One of the links may be joined in a straight line segment between the marker having the number 0 associated therewith and the marker having the number 5 associated therewith.

One embodiment of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Referring to the accompanying figures there is illustrated an educational device generally indicated by reference numeral 10. The device is well suited for demonstrating various mathematical concepts including basic arithmetic operations such as counting in multiples, as well as assisting in understanding certain geometric forms and certain equations.

The device includes a base 12 which is generally flat and rectangular in contour so as to define flat top and bottom surfaces spanning the width and length of the base.

A plurality of markers 14 are supported on the top surface of the base in which each marker comprises a post which extends vertically upward from the top surface of the base, perpendicular to the base and parallel with the other posts. The markers 14 are arranged to be evenly spaced along a generally annular path on the base 12 in which the generally annular path is understood to comprise any shape of perimeter including a square perimeter, a triangular perimeter or other geometric shapes. In the illustrated embodiment the markers 14 are positioned in an annular path which is circular with the markers being evenly spaced about the circumference or perimeter thereof in a generally cyclical and repeating sequence along the annular path.

Indicia 16 are provided on the base adjacent each marker to associate a number with each marker 14. The indicia comprise a set of ten numbers to match the ten markers 14 which are evenly spaced about the annular path. The numbers are associated with the markers in sequence such that the marker with the number zero associated therewith is positioned between the marker having the number nine associated therewith and the marker having the number one associated therewith. The remaining markers having the numbers one through nine associated therewith are positioned in increasing numerical order when advancing from one marker to the next in a clockwise direction about the annular path.

A plurality of links 18 are provided which are arranged to visually associated any one of the markers with any other one of the markers. Each link 18 comprises a loop of elastic material of suitable dimension so that it can be supported under tension stretched between or extending about any two of the markers 14 to form a straight line path between the two markers being visually associated with one another by the links.

The links 18 can be joined between associated pairs of markers 14 to form various patterns of the links 18. These patterns include a decagon, a pentagon, a pentagram, a decagram, a straight line segment, and a single point. In each instance the marker having the number zero associated therewith is included in the geometric form being represented. Accordingly the links are attached onto the posts forming the markers in a manner such that the marker having the number zero associated therewith is first visually associated with another one of the markers which is advanced in the clockwise direction about the annular path by a given number of spaces comprising either an adjacent marker, the second marker, the third marker, the fourth marker or the fifth marker. The marker which has been associated with the marker number zero is then associated with another marker which is similarly advanced about the annular path by a same number of spaces, that is by the given number. This pattern continues until another one of the markers is associated back with the marker number zero to form a closed geometric form. By following the path of the links, the final digit of each number in a sequence of numbers when counting in multiples is indicated in which each geometric form which is produced by the links indicates the sequence of final digits when counting by a first multiple in the clockwise direction and when counting by a second multiple when advancing through the markers along the links in a reverse counter clockwise direction.

Figure 1:
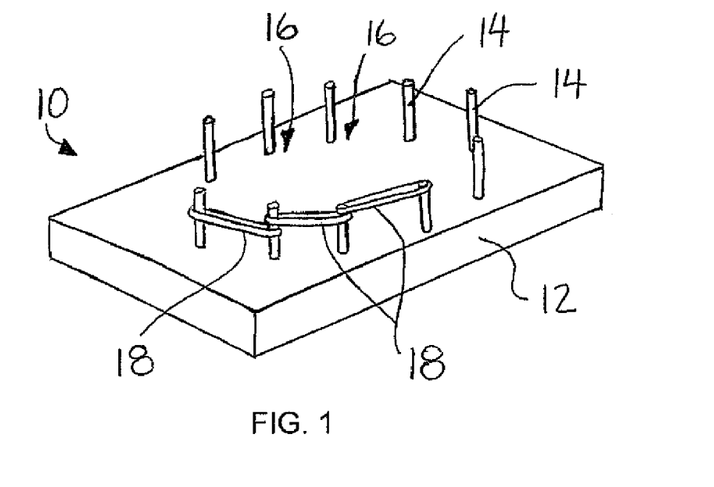
FIG. 1 is a perspective view of the educational device.
Figure 2:
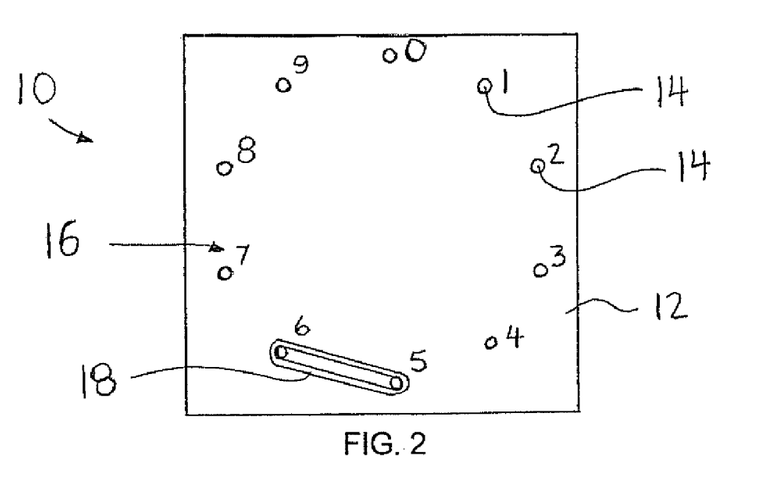
FIG. 2 and FIG. 3 are respective top plan and side elevational views of the device.
Figure 3:
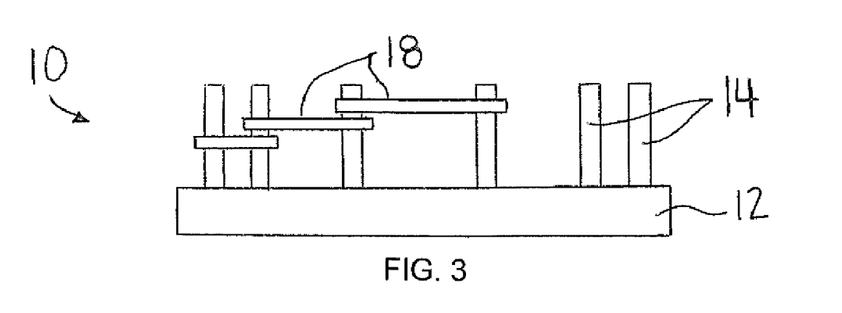
Figure 4:
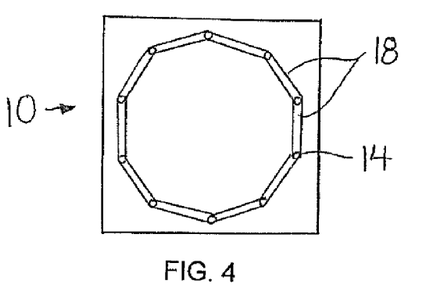
FIGS. 4 through 9 illustrate various patterns of the links to provide indication of the final digits of the numbers in a sequence of numbers when counting by different multiples respectively.

When attaching links to form a decagon, for example as shown in FIG. 4, the links are connected between the markers so that each marker is connected or associated with the two adjacent markers. Accordingly when advancing through the markers in the clockwise direction along the links, a sequence of numbers zero through nine is generated which represent the final digits of the numbers in the sequence of numbers when counting by one. Alternatively, when counting in multiples of nine, following the links in the opposing counter clockwise direction provides an indicating of all of the final digits of the resulting sequence of numbers. When counting in multiples of eleven, the same path can be followed as when counting by multiples of one as the same sequence of numbers is generated.

Figure 5:
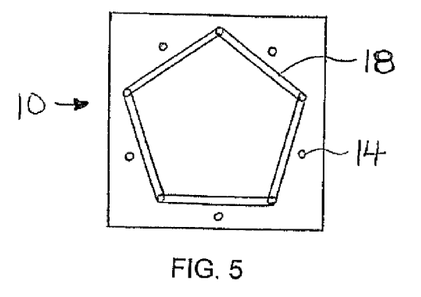

Turing now to FIG. 5, the links can be set up to be associated with each second one of the markers along the annular path starting from marker number zero so that the links form the shape of a pentagon. When a pentagon is formed connected between marker numbers zero, two, four, six and eight. Following the links in the clockwise direction about the annular path serves to indicate the final digit of each number in a sequence of numbers when counting in multiples of two. With the links set up in the same manner to form a pentagon, advancing through the markers along the links in the opposing counter clockwise direction serves to indicate the final digit of each number in the sequence of numbers when counting in multiples of eight.

Figure 6:
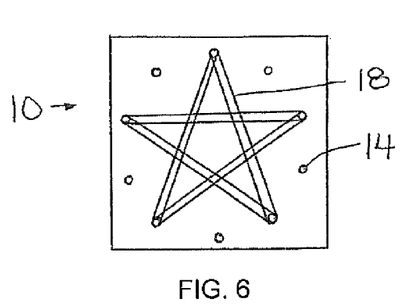

Turning now to FIG. 6, the links are associated between the markers in the pattern of a pentagram by connecting the links between the set of five markers comprising every second marker along the path. Each marker is thus associated with a marker which is advanced by four positions and six positions along the path respectively. The five markers thus form the apexes of the pentagram which is formed. When following along the links between the markers generally in the clockwise direction a resulting sequence of numbers is generated comprising markers having the numbers zero, four, eight, two and six associated therewith. Accordingly this sequence serves to indicate the final digit of each number in a sequence of numbers when counting in multiples of four. When following the links in the opposing generally counter clockwise direction from one marker to the next, the resulting sequence of numbers which is generated indicates the final digit of each number in a sequence of number when counting in multiples of six.

Figure 7:
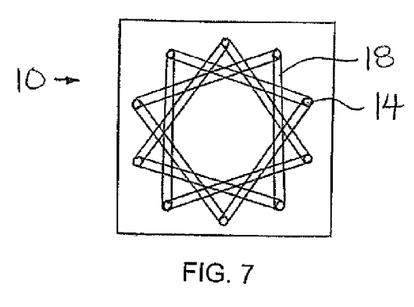
Figure 8:
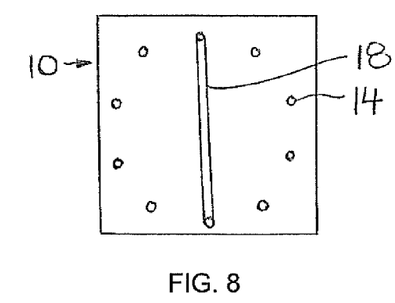

Turning now to FIG. 7, the links are shown connected between all of the markers in a pattern which forms a decagram. The decagram as described herein is also known as a star with 10 points, formed by 10 straight lines between the vertices of a decagon and enclosing another decagon. In the instance of a decagram each marker is associated with another marker which is advanced by three positions and seven positions respectively about the annular path. When advancing through the markers along the links generally in the clockwise direction, the final digits of each number in a sequence of numbers when counting in multiples of three are indicated. By following the links in the reverse direction so as to be generally counter clockwise, the sequence of numbers generated serves to indicate the final digit of each number in a sequence of numbers when counting in multiples of seven.

Figure 9:
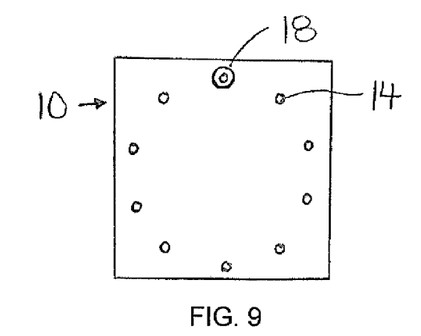

Turning now to FIG. 9, the links can be arranged so as to form only a single link extending diametrically from the marker number zero to the marker number five. Accordingly the two numbers in the sequence being generated are zero and five in repetition which serve to indicate the final digit of each number in a sequence of numbers when counting in multiples of five.

As shown in FIG. 9, when wrapping one of the links about a single marker, more particularly the marker number zero, a sequence is generated which represents the final digit of each number in the sequence of numbers when counting in multiples of ten, that is a sequence of zeros is represented.

As illustrated herein, the educational device 10 serves to provide some indication to a person learning mathematics as to the final digit in a sequence of numbers when counting in multiples to provide some visual assistance to the learner to recognise repeating patterns of numbers. In time, by learning these repeating patterns the learner readily familiarizes themselves with various techniques for counting in multiples as well as for recognizing various geometric patterns and various equations using the device 10.

The various configurations and uses of the device 10 will now be described in further detail in the following.

The device 10 is also described herein as the Decagon Wheel. The device 10, or Decagon Wheel, is a tool that teachers can use with their students to acquire and apply Math concepts related to Number Patterns.

1. Introducing the Decagon Wheel a. The Decagon Wheel: a Fun Tool for Making Sense of Number Patterns The device 10 according to the illustrated embodiment comprises a wooden board with ten pegs, each of which represents a digit. When these digits are connected to each other in order from 0-9 and back to 0, a 10-sided geometric shape is created called a decagon; hence the name.

It offers a visual representation of number properties and sequences, based on six geometric arrangements.

The 6 geometric arrangements on the Decagon Wheel are easily recognized and reproduced, making it possible to visualize number patterns easily. Though these arrangements are 2 dimensional, there is also a 3 dimensional component that helps to see larger numbers and add fluency to finding multiples.

The Decagon Wheel is a tool that helps us make sense of numbers; they are not arbitrary nor are they to be learned by rote. They are to be understood. With the Decagon Wheel, larger numbers can be easily visualized without the constraint of lengthening a number line or increasing the number of squares in a number grid.

The Decagon Wheel answers the needs of the visual or tactile learners by allowing them to see, to touch and to build number sequences. It facilitates the teaching and learning of concepts such as skip counting, estimating, learning number facts and problem solving.

b. Ten Ways to Explore with the Decagon Wheel

With the Decagon Wheel, you can uncover 6 geometric arrangements which represent all possible number sequences from 0 to infinity.

You can visualize and find multiples and common multiples with speed and accuracy.

You can strengthen number fact acquisition by making connections between numbers.

You can create a visual representation of an equation.

You can strengthen skills in estimating.

You can make connections between smaller and larger numbers.

You can create and learn the names of polygons up to 10 sides.

You can demonstrate lines of symmetry.

You can exercise creativity through making designs.

You can use it with tables, a calculator or spread sheet to solve problems, investigate conjunctures about counting sequences, multiples and algebraic equations.

c. What Makes the Decagon Wheel Unique

There are many tools such as the Abacus and Base Ten Blocks that can help develop concepts in composing numbers and place value. The Decagon Wheel however is a distinctive tool for it helps a person focus on the numerical sequences found in the one's column, sequences which are often overlooked. The study of these numerical sequences allows a person to count fluently by any number.

When introduced to the Decagon Wheel, children feel empowered. With it they are given the ability to extend number sequences and learn their multiples with ease. This increases their confidence. Many outshine siblings and adults in their capacity to manipulate numbers.

Adults are pleasantly surprised by what they learn when introduced to the properties of the Decagon Wheel. Their understanding of numbers expands. They become aware of number properties that have been overlooked or missed in their past learning experience. Feeling particularly confident in knowing their times tables to 12 by heart, most adults are in awe of their eight year old who not only grasps 9×12 but also can rant off multiples like 9×13, 9×14, 9×15 and keep going on and on without any trouble.

Learning the times tables to 12 by rote has long been an ongoing practice. The Decagon Wheel allows for a better understanding of number concepts. With this method of learning, multiplications can be mastered without using rote learning at all.

This one skill in Math might not make a child brilliant in all areas but it serves as a great base to learning facts, to understanding numbers and patterns, but most importantly in opening children's eyes. Once a child has worked a little with the Decagon Wheel, they begin looking for patterns everywhere. This equips them with better problem solving skills as they seek new ways of understanding.

Using the Decagon Wheel is a perfect way to beat the "multiplication blues". When children are required to memorize number facts in isolation of number concepts they are often discouraged. Multiples are difficult to memorize in a vacuum. With the Decagon Wheel children see the bigger picture. They see numbers as making perfect sense and multiplication as something they can grasp. This in turn makes the Decagon Wheel even more appealing!

The Decagon Wheel brings pleasure back into learning as it increases numeric skills and expands ones horizons.

d. Getting Started: Putting the Decagon Wheel in Motion

The next section offers practical guidelines for using the Decagon Wheel with students so that they can create meaning from number patterns. The key principles are described in detail and practical exercises using these principles allow students to build their skills. Each exercise is clearly outlined. Finally, additional suggestions are made for strengthening skills and using the Decagon Wheel in other creative ways.

As educators adopt the Decagon Wheel as a tool for creative Math Learning, they will be able to build on the method and expand its use in their classroom. They will discover that this apparently simple tool can offer much in empowering students to approach Math with confidence and discover the links that make it a relevant and fun subject . . . today and for many years to come!

2. The Decagon Wheel in Motion 2.1. Starting Point: Getting Started

Observe the Decagon Wheel.

Notice the 10 pegs numbered from 0 to 9. They are placed on a board in a circular fashion. It looks a little like a clock except that the 0 is on the top and the five is directly below. As we are conditioned to seeing the clock from the time we are born, it is important to look closely at how the Decagon Wheel differs.

The form of the Decagon Wheel reinforces that our number system is base 10. In essence that is why it works.

Each of the 10 pegs has a numeral attached to it.

Each numeral represents infinity of numbers with the same digit in the one's column.

For example: 0 represents, 0, 10, 20, 30, 40 and all the numbers that end with 0; 1 represents 1, 11, 21, 31 and all the numbers that follow this same pattern.

2.2 Visual Expressions: Uncover It's Properties a. Discovering the First Geometric Arrangement—Decagon (10 Sided Polygon)

To begin, take an elastic band and attach it from the 0 to 1.

Take a new elastic band and attach it from the 1 to 2.

Attach an elastic from the 2 to 3, 3 to 4, 4 to 5, 5 to 6, 6 to 7, 7 to 8, 8 to 9.

Attach the 9 back to 0.

Look at the Decagon Wheel.

Notice that when you attached the digits in this order you created a decagon (a 10-sided polygon).

The decagon is the first geometric arrangement.

It allows you to count by 1 or any number that has a 1 in the one's column like 11, 21 or 31 as well as by 9 or by any number composed with a 9 in the one's column, like 19, 29, 109.

Counting by 1 or 11 with the Decagon Wheel

When you count by one, you always go in the same direction, following the contours of the Decagon Wheel. You move clockwise from the 0. When you focus solely on the pattern in the one's column you recognize that the pattern repeats itself over and over again to infinity.

| 0  | 1  | 2  | 3  | 4  | 5  | 6  | 7  | 8  | 9  |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |

Even though, this is a pattern that is easily recognizable, most people do not recognize that this same principal applies to counting by 11. Notice the pattern in the one's column is constant.

| 0   | 11  | 22  | 33  | 44  | 55  | 66  | 77  | 88  | 99  |
|-----|-----|-----|-----|-----|-----|-----|-----|-----|-----|
| 110 | 121 | 132 | 143 | 154 | 165 | 176 | 187 | 198 | 209 |
| 220 | 231 | 242 | 253 | 264 | 275 | 286 | 297 | 308 | 319 |
| 330 | 341 | 352 | 363 | 374 | 385 | 396 | 407 | 418 | 429 |
| 440 | 451 | 462 | 473 | 484 | 495 | 506 | 517 | 528 | 539 |
| 550 | 561 | 572 | 583 | 594 | 605 | 616 | 627 | 638 | 649 |

Writing down the numbers in a table as above allows you to focus on other patterns too.

Example: In the 0 column look at the multiples that follows, 110, 220, 330, and 440. It is obvious when the numbers are displayed like this that the next number in the 0's column are going to be 550, 660, 770 etc.

Notice how the numerals in the tens and hundreds increase.

First you have 11 in 110, 12 in 121, 13 in 132 and 14 in 143 all the way to 20 in 209. As you begin the next line you start at 220 and then you go up the same way as before; 23 in 231, 24 in 242 and 25 in 253 etc.

You can transpose the table for 11 to discover other fascinating patterns.

Add the numerals of each number in the table above. The number 11 becomes 2 by adding the numerals 1+1. (1+1=2). 22 becomes 4 by adding 2+2

Place the answers in a new table like the one below.

| 0 | 2 | 4 | 6 | 8 | 10 | 12 | 14 | 16 | 18 |
|---|---|---|---|---|----|----|----|----|----|
| 2 | 4 | 6 | 8 | 10 | 12 | 14 | 16 | 18 | 11 |
| 4 | 6 | 8 | 10 | 12 | 14 | 16 | 18 | 11 | 13 |
| 6 | 8 | 10 | 12 | 14 | 16 | 18 | 11 | 13 | 15 |
| 8 | 10 | 12 | 14 | 16 | 18 | 11 | 13 | 15 | 17 |
| 10 | 12 | 14 | 16 | 18 | 11 | 13 | 15 | 17 | 19 |

Look closely at this new table and you may see other patterns. When you begin looking for patterns and sequences you discover so many new relationships between numbers that you could not possibly write them all in a book. Numbers are fun in the way they are constant. When we allow ourselves to play with numbers, we can discover new things on our own.

In this activity, what is important to retain is that:
Numbers make sense
A pattern in the one's column exist for any number and its multiples
Pattern can be represented by a particular geometric formation
Geometric formation is the same for all numbers that end with the same value in the one's column.

When two whole numbers added together equal 10, both numbers share the same geometric formation. One plus nine equals ten, therefore they both share the same geometric formation which is the 10-sided decagon. So let's discover how to count by nine.

Number properties come to the surface when looking at the Decagon Wheel for patterns and sequences in numbers.
Counting by 9 with the Decagon Wheel Counting by 9 is just like counting by 1 except that the numerals in the one's column are in reverse order. Instead of moving clockwise as we do when we count by 1, we move counterclockwise (0 to 9, 9 to 8, to 7, to 6, to 5 to 4, to 3, to 2, to 1 and back to 0)

To begin, build the decagon on the Decagon Wheel as you count by 9.
Attach an elastic from 0 to 9 and count 9.
Attach a new one from 9 to 8 and count 18.
Attach one from 8 to 7 and count 27.
Attach one from 7 to 6 and count 36.
Attach one from 6 to 5 and count 45.
Attach one from 5 to 4 and count 54.
Attach one from 4 to 3 and count 63.
Attach one from 3 to 2 and count 72.
Attach one from a new one 2 to 1 and count up to 81.
Attach one from 1 to 0 and count up to 90. Now the decagon is complete.

Now that the decagon is complete you can keep counting up as you follow the contours of the decagon. With a finger on the board, point to 9 and then count 99. Point to 8 and then count 108. Point to 7 and count 117; to 6 and count 126; to 5 and count 135; to 4 and count 144, to 3 and count 153, to 2 and count 162, to 1 and count 171 and back to 0 and count to 180.

Practice counting up a few cycles, then turn the board over and see if you can count without looking at it.

| 0 | 9 | 18 | 27 | 36 | 45 | 54 | 63 | 72 | 81 |
|---|---|----|----|----|----|----|----|----|----|
| 90 | 99 | 108 | 117 | 126 | 135 | 144 | 153 | 162 | 171 |
| 180 | 189 | 198 | 207 | 216 | 225 | 234 | 243 | 252 | 261 |
| 270 | 279 | 288 | 297 | 306 | 315 | 324 | 333 | 342 | 351 |
| 360 | 369 | 378 | 387 | 396 | 405 | 414 | 423 | 432 | 441 |

To increase your speed, you can focus on what is happening in the 10's and 100's column. If you isolate the tens and hundreds column a new pattern emerges.
There are 9 tens in 90,
9 repeats in 99.
Afterwards the number in the tens and hundreds increase by one. Now we see 10 in 108; 11 in 117; 12 in 126, 13 in 135, 14 in 144, 15 in 153, 16 in 162, 17 in 171, 18 in 180
As you pass 0, 18 repeats again in 189.
Count into the 300's or more. The higher you count, the more you focus on the concept that multiples of numbers always follow the same sequence. You depend less on learning through rote and more on understanding number properties.

When we place too much emphasis on rote learning, we tend to turn off the part of our brain that allows us to think through a problem. We don't estimate, nor discover that we can see a pattern if we look.

This is one reason why students have trouble solving problems with larger numbers. When they have difficulty visualizing a large number, they do not know what to do. With the Decagon wheel, we grasp the relationship between smaller and larger numbers. We recognize the similarities between 9, 99, 189 and 279.

When we truly master the decagon board, we no longer need to use it. We can turn the board over and count by 9's, 19's or 29's through our sense of numbers and ability to estimate and focus.

A primary purpose of the Decagon Wheel is to focus on the simplicity and infinity of numbers. Luckily as the board is circular in formation, numbers can be seen getting larger without having to increase space of a number grid or lengthen a number line. Numbers increase in power even though the ones stay constant.

Always remember that counting by nine is like counting by one. If you can count backwards from ten to zero, then you can count by nine!

b. Discovering the Second Geometric Arrangement—Pentagon (5 Sided Polygon)
Attach 0 to 2, 2 to 4, 4 to 6, 6 to 8 and then 8 back to 0.
Notice that you have a 5-sided shape called a pentagon.
This shape represents both patterns for 2 and 8. (2+8=10).
When we count clockwise, we have the pattern for 2.

| 0 | 2 | 4 | 6 | 8 |
|---|---|---|---|---|
| 10 | 12 | 14 | 16 | 18 |
| 20 | 22 | 24 | 26 | 28 |
| 30 | 32 | 34 | 36 | 38 |

When we count counterclockwise starting at the 0 we have the pattern for 8.

| 0 | 8 | 16 | 24 | 32 |
|---|---|----|----|----|
| 40 | 48 | 56 | 64 | 72 |
| 80 | 88 | 96 | 104 | 112 |
| 120 | 128 | 136 | 144 | 152 |

The pentagon has five vertices. An even number digit is associated with each vertex.

When you count by 2 or 8 the digits are always even.

The sequences follow the natural order of numbers, increasing by 2 (0, 2, 4, 6, 8) when counting by 2 or decreasing by 2 when counting by 8. (8, 6, 4, 2, 0)

Once you've practiced counting by eight using the Decagon Wheel, you will be able to find the multiples of 8 without it. The image of the pentagon is relatively easy to keep in your head and quick to draw on paper.

A student can quickly verify the answer of a multiplication fact by drawing a pentagon and using it to count.

Counting by 8 is not much different than counting by 2. When someone is first introduced the concept of counting by 8, they may need a little more assistance. Talking through the process may be helpful. This is what it would sound like Thinking Process:

First I count 8.

The next number ends with a number which is 2 less than 8. This equals 6. It is more than 8. It is 16.

The next number ends with a number which is 2 less than 6. This equals 4. It is more than 16. It is 24.

The next number ends with a number which is 2 less than 4. This equals 2. It is more than 24. It is 32.

The next number ends with a number which is 2 less than 2. This equals 0. It is more than 32. It is 40.

The next number ends with a number which is 2 less than 10. (0 represents 10). This equals 8. It is more than 40. It is 48.

There are many ways of solving a problem or equation. It is to be encouraged that we are open our mind to different ways. When we do, we put our creativity to practice. Without always depending on a paper and pencil, we can learn to solve equations in our head.

The Decagon Wheel is not meant to increase rote learning but increase one's ability to see and to think things through.

c. Discovering the Third Geometric Arrangement—Pentagram (5-Pointed Star)

The third geometric arrangement is the pentagram, a 5-pointed star. Historically it has lots of significance. It is one of the 6 geometric arrangements on the Decagon Wheel that is created with one continuous line which makes it infinite.

The pentagram is like the pentagon that it has five vertices. It is perfectly symmetrical. An even number is associated at each vertex. It is used for finding the multiples of 4 and 6. The pattern for 4 is 0, 4, 8, 2, 6 and the pattern for 6 is 0, 6, 2, 8, 4.

Attach 0 to 4

Attach 4 to 8.

Attach 8 to 2.

Attach 2 to 6.

Attach 6 back to 0.

The pentagram on the Decagon Wheel represents the multiples of 4 and 6.

Notice that 4+6=10.

When we count clockwise from the 0 we have the pattern for 4.

| 0 | 4 | 8 | 12 | 16 |
|---|---|---|---|---|
| 20 | 24 | 28 | 32 | 36 |
| 40 | 44 | 48 | 52 | 56 |
| 60 | 64 | 68 | 72 | 76 |

When we count counterclockwise starting at the 0 we have the pattern for 6.

| 0 | 6 | 12 | 18 | 24 |
|---|---|---|---|---|
| 30 | 36 | 42 | 48 | 54 |
| 60 | 66 | 72 | 78 | 84 |
| 90 | 96 | 102 | 108 | 114 |
| 120 | 126 | 132 | 138 | 144 |

After practicing with the Decagon Wheel draw the pentagram freehand.

Practice counting by 4 and 6 without using numbers, only the 5-pointed star.

Once this is mastered you may have no difficulty counting by 4's and 6's even without a picture cue as you may be able to visualize a pentagram in your head. However, if you find you are getting confused you may need to review the concept of "Place Value".

The Value of Understanding Place Value

As we practice counting by 4 and 6, we become more fluent as our skills in estimating increase. For example, when we count by 6 and we arrive at 96 and we know the next number ends in 2, we ask ourselves, "What makes sense? The number isn't much larger than 96 and it ends with a 2. It must be 102".

These connections happen with such speed we are not always aware of them. However as we later challenge ourselves to count by 16, 26 and 36; we develop a stronger sense of place value.

Numbers are made of numerals placed in a certain order. The value of that numeral depends on its position. In the number 436, four is worth 400, 3 is worth 30 and 6 is worth 6. The 4 is in the hundred's column, the 3 is in the ten's column and the 6 is in the one's column. That is what we mean by place value.

A student might make the following mistake while counting, "6, 12, 18, 24, 30, 36, 32 . . . "

At that very moment you would stop the student and ask them "Does this make sense?"

The student recognizes that it doesn't make sense as the number after 36 has to get larger. As the number ends with 2, they understand it is the tens that go up. Hence the answer is 42.

Focusing on the ones, allows for fluency. Understanding place value allows us to assess mistakes we might make.

d. Discovering the Fourth Geometric Arrangement (10-Sided Star)

The 10-pointed star is special like the pentagram in that it can be created without lifting a pencil off a paper.

It is continuous in shape. It represents both counting by 3 and counting by 7. Take notice that 3+7=10.

When you are about to make a 10-pointed star, you may want to begin by simply counting by 3 and attaching the elastics simultaneously on the Decagon Wheel.

Attach the elastic from 0 to 3.

Attach from 3 to 6.

Attach from 6 to 9.

Attach from 9 to 2.

Attach from 2 to 5.

Attach from 5 to 8.

Attach from 8 to 1.

Attach from 1 to 4.

Attach from 4 to 7.

Attach from 7 back to 0.

Young children learn to count by 3's by having fun. They are very excited when the 10-pointed star suddenly appears.

However, if they make a mistake and the star doesn't appear, they take off the elastics and try again without even being asked.

They get direct feedback and pleasure when in creating this beautiful geometric arrangement.

When we count clockwise from the 0, we have the pattern for 3.

| 0  | 3  | 6  | 9  | 12  | 15  | 18  | 21  | 24  | 27  |
|----|----|----|----|-----|-----|-----|-----|-----|-----|
| 30 | 33 | 36 | 39 | 42  | 45  | 48  | 51  | 54  | 57  |
| 60 | 63 | 66 | 69 | 72  | 75  | 78  | 81  | 84  | 87  |
| 90 | 93 | 96 | 99 | 102 | 105 | 108 | 111 | 114 | 117 |

When we count counterclockwise from 0 we have the pattern for 7.

| 0   | 7   | 14  | 21  | 28  | 35  | 42  | 49  | 56  | 63  |
|-----|-----|-----|-----|-----|-----|-----|-----|-----|-----|
| 70  | 77  | 84  | 91  | 98  | 105 | 112 | 119 | 126 | 133 |
| 140 | 147 | 154 | 161 | 168 | 175 | 182 | 189 | 196 | 203 |
| 210 | 217 | 224 | 231 | 238 | 245 | 252 | 259 | 266 | 273 |

Observe that the numerical pattern of the one's column include all 10 numerals, when counting by 3 and 7. These numerals don't follow the natural order of numbers and the 10-pointed star is more challenging to visualize. So the process to counting is slightly different.

Rather than focusing on the 10-pointed star shape, we focus on the relationship of the numerals is the one's column. When we count by 3 and 7, you may notice that the numbers follow an even and uneven pattern. For example, 7 is uneven, 14 is even, 21 is uneven, 28 is even.

When we practice counting by 3 on the Decagon Wheel we will come to notice that the star is created by always skipping two pegs and then attaching an elastic to the 3 peg. (start at 0. Jump two pegs, attach elastic to 3 . . . jump 2 pegs, attach elastic to 6, jump 2 pegs, attach on 9 etc.) This is the concept of counting by 3.

What most people don't realize is that counting by 3 is very similar to counting by 7. When we count by 7, we also jump two pegs however we move counterclockwise. In essence we subtract by 3 to find the value of the numeral in the one's column.

Thinking Process
Start at 7.
Subtract 3 from 7. (7−3=4).
The next number ends with 4 so the number is 14.
Subtract 3 from 4. ((4−3=1) The number ends with 1 and is 21.
Subtract 3 from 11 (11−3=8). The number is 28. (You could also add 21+7=28)
8−3=5, so the next number is 35.
5−3=2, so the number is 42.
Rather than subtract add 42+7=49 because it is simpler.
9−3=6, so the number is 56.
6−3=3, so the number is 63.
3−3=0 so the number is 70.

The purpose of the Decagon Wheel is not to strengthen rote learning, but rather to increase the ability to perceive and extend patterns.

e. Discovering the Fifth Geometric Arrangement—Line Segment

On the Decagon Wheel attach 0 to 5 and you have the fifth geometric arrangement, which is simply a line segment. This line segment is the same for all numbers that end with 5. (5, 15, 25, 35)

When we count by five the numeral in the one's column is 0 and 5. As it is quite simple, it is one of the first number patterns children catch onto. However there are those children who have difficulty processing through what they hear. They may not be able to detect a pattern shared orally.

The Decagon Wheel provides the visual cue that some children need to be able to see how to count by 5. The line segment makes it so easy to see the pattern and clearly understand it. It makes sense!

Let's go further. Look at the following pattern for 15 and 35. The first ten numbers of the pattern are placed at the top of the table. It doesn't matter how many numbers are placed on top, as long as the ones line up so that the zeros and fives are on top of each other.

| Pattern for 15 |||||||||||
|-----|-----|-----|-----|-----|-----|-----|-----|-----|-----|
| 0   | 15  | 30  | 45  | 60  | 75  | 90  | 105 | 120 | 135 |
| 150 | 165 | 180 | 195 | 210 | 225 | 240 | 255 | 270 | 285 |
| 300 | 315 | 330 | 345 | 360 | 375 | 390 | 405 | 420 | 435 |
| 450 | 465 | 480 | 495 | 510 | 525 | 540 | 555 | 570 | 585 |
| 600 | 615 | 630 | 645 | 660 | 675 | 690 | 705 | 720 | 735 |

Notice that when you count by 15, there is a pattern in the tens. The tens go up by two, then one (+2, +1, +2, +1, +2, +1 . . . )

Think this through. Every time you add two fives together you create that extra ten which is then carried over to the ten's column.

When you count by 15 the numbers end with 5 or 0.

When it ends with a 5, the next number will have 2 more tens and end with 0.

When it ends with a 0, the next number will have 1 more ten and end with 5.

When you place the numbers in a table as above you will make even more connections. Look at what happens in each column.

In the tens place there are patterns to uncover. For example in the first column of numbers you have 0, 5, 0, 5, 0, 5. In the second column of numbers you have in the tens the pattern 1, 6, 1, 6, 1, 6. In the third column in the tens you have the pattern 3, 8, 3, 8, 3, 8. This kind of pattern is repeated in every column making it easy to verify if numbers are correct.

In the hundreds column, if you were to count how many times you would repeat a numeral reading across you discover a 7, 7, 6 pattern. There are 7 zeros, 7 ones then 6 twos. There are 7 threes, 7 fours then 6 fives. There are 7 sixes, 7 sevens, then 6 eights . . . this patterns continues this way infinitely.

| Pattern for 35 |||||||||||
|------|------|------|------|------|------|------|------|------|------|
| 0    | 35   | 70   | 105  | 140  | 175  | 210  | 245  | 280  | 315  |
| 350  | 385  | 420  | 455  | 490  | 525  | 560  | 595  | 630  | 665  |
| 700  | 735  | 770  | 805  | 840  | 875  | 910  | 945  | 980  | 1015 |
| 1050 | 1085 | 1120 | 1155 | 1190 | 1225 | 1260 | 1295 | 1330 | 1365 |
| 1400 | 1435 | 1470 | 1505 | 1540 | 1575 | 1610 | 1645 | 1680 | 1715 |
| 1750 | 1785 | 1820 | 1855 | 1890 | 1925 | 1960 | 1995 | 2030 | 2065 |
| 2100 | 2135 | 2170 | 2205 | 2240 | 2275 | 2310 | 2345 | 2380 | 2415 |

In the pattern for 35, you will notice resemblances with the pattern for 15. In the tens there is a distinctive pattern made with 2 numerals.

In the hundreds column there is a 3, 3, 3, 3, 3, 3, 2 pattern. There are 3 zeros, 3 ones, 3 twos, 3 threes, 3 fours, 3 fives and then 2 sixes. There are 3 sevens, 3 eights, 3 nines, 3 tens, 3 elevens, 3 twelve and then 2 thirteen. This pattern keeps repeating itself.

| Pattern for 25 | | | |
|---|---|---|---|
| 0 | 25 | 50 | 75 |
| 100 | 125 | 150 | 175 |
| 200 | 225 | 250 | 275 |
| 300 | 325 | 350 | 375 |

Only 4 numbers were placed at the top because of a habit of counting money. 25, 50, 75 a dollar! This is an easy pattern to learn because the ones and tens stay constant. The hundreds increase every 4 times.

Placing 10 numbers at the top of a table would also be correct, as long as you line up the zeros and fives in the ones column.

| Pattern for 25 | | | | | | | | | |
|---|---|---|---|---|---|---|---|---|---|
| 0 | 25 | 50 | 75 | 100 | 125 | 150 | 175 | 200 | 225 |
| 250 | 275 | 300 | 325 | 350 | 375 | 400 | 425 | 450 | 475 |
| 500 | 525 | 550 | 575 | 600 | 625 | 650 | 675 | 700 | 725 |
| 750 | 775 | 800 | 825 | 850 | 875 | 900 | 925 | 950 | 975 |

There are connections to be made everywhere. Anyway you look, horizontally, vertically and even diagonally you will see a numerical pattern.

The more we look, the more connections we make!

f. Discovering the Sixth Geometric Arrangement—A Single Point

The sixth geometric arrangement is simply a point on the Decagon Wheel. The single point represents counting by ten and all numbers that have a zero in the ones column. A single point explains why it is so simple to count by ten! Counting by tens isn't very different from counting by 100, 1000, 10 000 and so on.

| Pattern for 10 | | | | | | | | | |
|---|---|---|---|---|---|---|---|---|---|
| 0 | 10 | 20 | 30 | 40 | 50 | 60 | 70 | 80 | 90 |
| 100 | 110 | 120 | 130 | 140 | 150 | 160 | 170 | 180 | 190 |

| Pattern for 100 | | | | | | | | | |
|---|---|---|---|---|---|---|---|---|---|
| 0 | 100 | 200 | 300 | 400 | 500 | 600 | 700 | 800 | 900 |
| 1000 | 1100 | 1200 | 1300 | 1400 | 1500 | 1600 | 1700 | 1800 | 1900 |
| 2000 | 2100 | 2200 | 2300 | 2400 | 2500 | 2600 | 2700 | 2800 | 2900 |

The point also represents any number that ends in 0. (20, 30, 40 . . . ) When we count by 20, we actually count by 2 and add the appropriate number of zeros. When we count by it is more practical to use the pentagon and add a 0. When we count by 30 we think out the pattern for 3 and add 0. When we count by 90, we think of the pattern for 9 and add a 0.

| 0 | 20 | 40 | 60 | 80 | | | | |
|---|---|---|---|---|---|---|---|---|
| 100 | 120 | 140 | 160 | 180 | | | | |
| 200 | 220 | 240 | 260 | 280 | | | | |
| 0 | 30 | 60 | 90 | 120 | 150 | 180 | 210 | 240 | 270 |
| 300 | 330 | 360 | 390 | 420 | 450 | 480 | 510 | 540 | 570 |
| 600 | 630 | 660 | 690 | 720 | 750 | 780 | 810 | 840 | |

The Decagon Wheel makes learning fun—It takes the fear out of numbers!

2.3 Principles in Action: Skill-Building Activities a. Finding Multiples

When finding number patterns on the Decagon Wheel, we look at a 2 dimensional geometric arrangements. When finding multiples, the Decagon Wheel takes on a third dimension. As we know, each peg is associated with a numeral. Imagine that all the multiples related to that numeral are extending upwards on that same peg. (−120, −100, −80, −60, −40, −20, −0)

So further up the peg you go, the higher you count. The question is how much higher?

Each number pattern differs. To find out how much higher, begin at zero and count by any number until you arrive at 0 again. That number that ends with 0 is the key to finding the rest of the multiples.

Here is an example pattern we count "0, 4, 8, 12, 16, 20". The first number we arrive to after 0, that ends with zero is 20. Twenty is the number we need to remember. If we add twenty to any number in a column, we can quickly find all the multiples of 4 ending with that same numeral; 4+20=24, 24+20=44, 44+20=64 . . . . These are all multiples for 4.

| 0 | 4 | 8 | 12 | 16 |
|---|---|---|---|---|
| 20 | 24 | 28 | 32 | 36 |
| 40 | 44 | 48 | 52 | 56 |
| 60 | 64 | 68 | 72 | 76 |

This method works for every number pattern Looking at the multiples for 2, the numbers increase by 10 (2, 12, 22, 32, 42 . . . ). As for 8 they increase by 40. (0, 40, 80, 120, 160 . . . ) For 7 they increase by 70 (0, 70, 140, 210, 280, 350 . . . ) This a very quick method to finding multiples.

b. Power of Observation

Here is part of the table showing multiples of 4. When we place the numbers in this order, you can see how the multiples increase by 20.

| 0 | 4 | 8 | 12 | 16 |
|---|---|---|---|---|
| 20 | 24 | 28 | 32 | 36 |
| 40 | 44 | 48 | 52 | 56 |
| 60 | 64 | 68 | 72 | 76 |
| 80 | 84 | 88 | 92 | 96 |
| 100 | 104 | 108 | 112 | 116 |
| 120 | 124 | 128 | 132 | 136 |
| 140 | 144 | 148 | 152 | 156 |
| 160 | 164 | 168 | 172 | 176 |
| 180 | 184 | 188 | 192 | 196 |

Look closely at table above. Do you see any other constants? For example, look at the tens column. In the first 3 columns (Column of 0, 4 and 8) an even number is found in the tens. In the last 2 columns (2 and 6), an uneven number is in the tens. This is a simple exercise of observation.

So what is the power of observation? This quick observation has given us the power to determine if a number is a multiple of 4 regardless of its length without having to count up by 4 or divide by 4. For example, someone gives you the number, 12 376 and asks if it can be evenly divided by 4. You can answer yes with confidence as it answers to two criteria we have already established. First the number ends with a 6 and all numbers that are multiples of 4 ends with an even number. Second, the numeral in the tens is uneven. We know that if it ends with 2 or 6, the number in the tens is uneven.

Is this the same rule for all numbers? No every number has its own set of properties. The great thing is that the Decagon Wheel allows us to use our own power of observation to discover number properties for ourselves. We can learn a set of rules by heart for determining multiples without understanding why, however being able to see, create and verify number rules for ourselves is a lot more valuable. It is what real learning is about!

The more we observe, the more connections we make and the better we understand.

e. Finding the Rules to Quickly Create Number Tables

Here is what counting by 6 would look like if placed in a table.

| 0 | 6 | 12 | 18 | 24 |
|---|---|---|---|---|
| 30 | 36 | 42 | 48 | 54 |
| 60 | 66 | 72 | 78 | 84 |
| 90 | 96 | 102 | 108 | 114 |
| 120 | 126 | 132 | 138 | 144 |
| 150 | 156 | 162 | 168 | 174 |
| 180 | 186 | 192 | 198 | 204 |
| 210 | 216 | 222 | 228 | 234 |
| 240 | 246 | 252 | 258 | 264 |

In each column, the numbers increase by 30. (30+30=60, 60+30=90). This is the initial way of creating this table. Now observe this table in a new way. If you were to recreate this table you could quickly write down the first 5 numbers of the sequence. Then you would make a column of zeros, sixes, twos, eights and fours underneath the appropriate column headed with 0, 6, 12, 18 and 24. To complete the rest of the numbers, simply count up by 3 and place that value in the tens and hundreds column.

Children are natural at finding shortcuts. When you allow them the space to do things in their own original way, you may discover that they have a better way of figuring things out. Allow creativity to rule when playing with numbers. We kill the natural instinct to play, when we try to make children do what we do.

Use the Decagon Wheel as a tool. Like a pair scissors, there is a method to use it, but what one chooses to cut out and do with it is their own creation.

f. Patterns within Patterns—Transposing Number Tables

Finding patterns within patterns is endless. Some would call it number play and feel it is a waste of time as it does not seem to bring "useful" information to the learner. On the contrary, making connections between numbers is what creates intelligence. Being curious, seeking answers and solving puzzles are skills greatly needed for a rapidly changing world.

Inventions come to those who know how to play. Play teaches us to find pleasure when taking risks. Play motivates and initiates exploration and discovery.

The following activity is an example of this number play. Look at this table for 11.

| 0 | 11 | 22 | 33 | 44 | 55 | 66 | 77 | 88 | 99 |
|---|---|---|---|---|---|---|---|---|---|
| 110 | 121 | 132 | 143 | 154 | 165 | 176 | 187 | 198 | 209 |
| 220 | 231 | 242 | 253 | 264 | 275 | 286 | 297 | 308 | 319 |
| 330 | 341 | 352 | 363 | 374 | 385 | 396 | 407 | 418 | 429 |
| 440 | 451 | 462 | 473 | 484 | 495 | 506 | 517 | 528 | 539 |
| 550 | 561 | 572 | 583 | 594 | 605 | 616 | 627 | 638 | 649 |

Transpose this table for 11 to discover other fascinating patterns.

Add the numerals of each number in the table above. The number 11 becomes 2 by adding the numerals 1+1. (1+1=2). 22 becomes 4 by adding 2+2.

Place these answer in the same place in a new table like the one below.

| 0 | 2 | 4 | 6 | 8 | 10 | 12 | 14 | 16 | 18 |
|---|---|---|---|---|---|---|---|---|---|
| 2 | 4 | 6 | 8 | 10 | 12 | 14 | 16 | 18 | 11 |
| 4 | 6 | 8 | 10 | 12 | 14 | 16 | 18 | 11 | 13 |
| 6 | 8 | 10 | 12 | 14 | 16 | 18 | 11 | 13 | 15 |
| 8 | 10 | 12 | 14 | 16 | 18 | 11 | 13 | 15 | 17 |
| 10 | 12 | 14 | 16 | 18 | 11 | 13 | 15 | 17 | 19 |

Notice as you read across this table you can see the birth of a new pattern. Without going further in the table for 11, you can already discover what the value of each number will be when you add its numerals together When you begin looking for patterns and sequences you discover so many new relationships between numbers that you could not possibly write them all in a book.

Numbers are fun in the way they are constant. When we allow ourselves to play with numbers, we can discover new things on our own.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of indicating a final digit of each number in a sequence of numbers when counting in multiples, the method comprising:
    providing an educational device comprising a base and a set of ten markers positioned on the base, the markers being spaced apart from one another along a generally annular path;
    associating each marker with a respective one of a range of numbers 0 through 9;
    associating the numbers with the markers in a sequence such that the marker having the number 0 associated therewith is positioned between the marker having the number 9 associated therewith and the marker having the number 1 associated therewith and the remaining markers are positioned in increasing numerical order when advancing from one marker to the next in a first direction about the annular path;
    visually associating the marker having the number 0 associated therewith another one of the markers having the number associated therewith corresponding to the final digit of the next number in the sequence of numbers; and
    visually associating each previously associated marker with a subsequent one of the markers having the number associated therewith corresponding to the final digit of the subsequent number in the sequence of numbers until the subsequent one of the markers is visually associated with the marker having the number 0 associated therewith.

2. The method according to claim 1 including indicating a final digit of each number in a sequence of numbers when counting in multiples of one by visually associating the markers relative to one another with links forming a decagon and advancing through the markers along the links generally in the first direction.

3. The method according to claim 1 including indicating a final digit of each number in a sequence of numbers when counting in multiples of nine by visually associating the markers relative to one another with links forming a decagon and advancing through the markers along the links generally opposite to the first direction.

4. The method according to claim 1 including indicating a final digit of each number in a sequence of numbers when counting in multiples of two by visually associating the markers relative to one another with links forming a pentagon and advancing through the markers along the links generally in the first direction.

5. The method according to claim 1 including indicating a final digit of each number in a sequence of numbers when counting in multiples of eight by visually associating the markers relative to one another with links forming a pentagon and advancing through the markers along the links generally opposite to the first direction.

6. The method according to claim 1 including indicating a final digit of each number in a sequence of numbers when counting in multiples of three by visually associating the markers relative to one another with links forming a decagram and advancing through the markers along the links generally in the first direction.

7. The method according to claim 1 including indicating a final digit of each number in a sequence of numbers when counting in multiples of seven by visually associating the markers relative to one another with links forming a decagram and advancing through the markers along the links generally opposite to the first direction.

8. The method according to claim 1 including indicating a final digit of each number in a sequence of numbers when counting in multiples of four by visually associating the markers relative to one another with links forming a pentagram and advancing through the markers along the links generally in the first direction.

9. The method according to claim 1 including indicating a final digit of each number in a sequence of numbers when counting in multiples of six by visually associating the markers relative to one another with links forming a pentagram and advancing through the markers along the links generally opposite to the first direction.

10. The method according to claim 1 including indicating a final digit of each number in a sequence of numbers when counting in multiples of five by visually associating the marker associated with the number 0 with the marker associated with the number 5.

11. The method according to claim 1 wherein each link is arranged to indicate a straight path between the markers being visually associated with one another by the link.

12. The method according to claim 1 wherein the ten markers are evenly spaced apart along the generally annular path.

13. The method according to claim 1 wherein the generally annular path is circular.

14. The method according to claim 1 wherein each marker comprises a post extending upwardly from the base.

15. The method according to claim 1 wherein the base is substantially flat and each marker comprises a post extending upwardly from the base, substantially perpendicularly to the base.

16. The method according to claim 1 wherein each marker comprises a post and each link comprises an elastic loop arranged to be extended about an associated pair of the markers.

17. The method according to claim 1 wherein there is provided indicia adjacent each marker which indicates the number associated with the marker.

18. An educational device comprising:
a base;
a set of ten markers positioned on the base, spaced apart from one another along a generally annular path;
each marker being associated with a respective one of a range of numbers 0 through 9;
the numbers being associated with the markers in a sequence such that the marker having the number 0 associated therewith is positioned between the marker having the number 9 associated therewith and the marker having the number 1 associated therewith and the remaining markers are positioned in increasing numerical order when advancing from one marker to the next in a first direction about the annular path;
a plurality of links, each being arranged to visually associate one of the markers with another one of the markers.

19. The device according to claim 18 wherein the base is substantially flat and each marker comprises a post extending upwardly from the base, substantially perpendicularly to the base.

20. The device according to claim 18 wherein each marker comprises a post and each link comprises an elastic loop arranged to be extended about an associated pair of the markers.

* * * * *